UNITED STATES PATENT OFFICE.

OSKAR BOETERS AND RICHARD WOLFFENSTEIN, OF BERLIN, GERMANY.

PROCESS OF PRODUCING NITRO COMPOUNDS.

No. 923,761.    Specification of Letters Patent.    Patented June 1, 1909.

Application filed July 30, 1907. Serial No. 386,259.

*To all whom it may concern:*

Be it known that we, OSKAR BOETERS and RICHARD WOLFFENSTEIN, subjects of the German Emperor, and residing at Berlin, Germany, have invented a certain new and useful Improved Process of Producing Nitro Compounds, of which the following is a specification.

The present invention has for its object an improved process of producing nitro compounds.

Nitro compounds which contain phenol groups are, generally speaking, produced by allowing nitric acid to act on the phenols; nitro-phenol or picric acid is thus formed from phenol, for example, in known manner. This method of producing nitro compounds presupposes that the hydroxyl group is already present in the compound which is to be nitrated. The introduction of a hydroxyl group into an organic compound is, however, as is known, an operation which can only be carried out with more or less difficulty. Now we have found that this previous introduction of the phenol group is superfluous, and that the entry of the hydroxyl group and of the nitro group can be effected in one operation, which moreover is very simple, when the nitrating process by nitric acid or azotic oxids is effected in the presence of mercury or mercury compounds; thus nitro-phenol or picric acid is formed from benzol, for example. In this manner it is superfluous to produce the phenol at first previously from the benzol. This reaction has proved usable in all benzol compounds which have been examined. That the reaction does take place may be outwardly clearly known by the fact that the reaction mixture develops large quantities of nitrous gases during the entire period of the experiment which must, of course, form in the reaction because the oxygen which is used for the formation of the hydroxyl group is taken out of the nitric acid, whereby the formation of nitrous gases (azotic oxid etc.) is easily explained.

It may be mentioned that the introduction of hydroxyl groups besides the diazo group into the nucleus of aromatic compounds by nitrous acid in the presence of mercury or mercury compounds is known from the German patent specification 161,954; anthrachinone is, for example, converted into 1-oxy-4 diazo-anthrachinone.

In order to illustrate the scope of the reaction in accordance with the present invention, some examples will now be given, in connection with which it may be particularly emphasized that the nitration is completed more or less according to the quantity or concentration of the nitric acid which is employed in each case:—

Example 1. For producing picric acid, 400 grm. benzol are heated with 660 grm. nitric acid (1,48) and 50 grm. mercuric nitrate or another mercuric compound in the water-bath. The product of the reaction, which contains nitro-benzol at the same time, is then subjected to distillation in order to remove this; picric acid remains in the residue; yield:—180 grm. The reaction is effected, in so far as the formation of picric acid is concerned, according to the equation

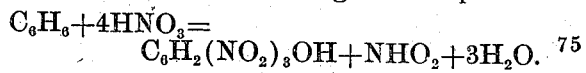
$$C_6H_6 + 4HNO_3 = C_6H_2(NO_2)_3OH + NHO_2 + 3H_2O.$$

Example 2. 400 grm. benzol are heated in the water-bath with 50 grm. nitrate of mercury or another mercuric compound and 1350 grm. nitric acid (1,39). Proceed further as in previous example; yield:—380 grm. picric acid; 160 grm. nitro-benzol; 2 grm. ortho-nitro-phenol.

Example 3. 400 grm. benzol are treated as in Example 2 with 50 grm. nitrate of mercury or another mercuric compound and 625 grm. nitric acid (1,39). On account of the smaller quantity of nitric acid the yield of ortho-nitro-phenol rises considerably and amounts to 38% in proportion to the picric acid. The substitution-products of benzol behave in this reaction like benzol; tri-nitro-creosol and mono-nitro-oxy-benzoic acid are formed from toluene for example. The latter acid is also formed in nitrating benzoic acid in the presence of nitrate of mercury, which reaction proceeds well with a nitric acid of specific gravity 1,35. An abundant quantity of picric acid, as well as chlornitrophenol is formed from chlorid of benzol with 50% nitric acid, and nitro naphthalene as well as 12% nitro-naphthols are formed from naphthalene with nitric acid of likewise 50%.

As already mentioned the example given above can easily result in different yields by varying the quantity and concentration of the nitric acid. Also, heterocyclic compounds with aromatic ring nuclei admit of the same reaction. For example, from quinolin a nitro-oxy-quinolin is formed which has the characteristic properties of nitrooxy-quinolin: solubility in soda, capability of being precipitated from this solution by acetic acid, a characteristic reddish coloration by chlorid of iron etc. The exact constitution of this nitro-oxy-quinolin has not yet been determined. As illustrating that, besides the nitro group, two hydroxyl groups have also been introduced by the above reaction, anthra-quinone may be mentioned which forms a characteristic deep blue dye in this reaction; this formation of coloring-matter is effected in the anthra-quinone series, as is known, only when at least 2 hydroxyl groups are present in the compound.

What we claim as our invention and desire to secure by Letters Patent is:—

1. A process of producing nitro compounds, consisting in heating aromatic compounds which are to be nitrated with a mixture of nitric acid and a mercury salt, and in distilling off the volatile products from the nitro phenols which are produced.

2. A process of producing nitro compounds, consisting in heating aromatic compounds which are to be nitrated with a mixture of nitric acid and mercuric nitrate, and in distilling off the volatile products from the nitro phenols which are produced.

3. A process of producing picric acid consisting in heating a mixture of benzol nitric acid and mercuric nitrate, and in distilling off the volatile products from the residue of picric acid.

In testimony whereof, we affix our signatures in the presence of two witnesses.

OSKAR BOETERS.
RICHARD WOLFFENSTEIN.

Witnesses:
E. BÖRNSTEIN,
ERICH PELTNER.